US012348082B2

(12) United States Patent
Garety et al.

(10) Patent No.: US 12,348,082 B2
(45) Date of Patent: Jul. 1, 2025

(54) FLUID COOLED STATOR WITH GROOVES IN STATOR CORE

(71) Applicant: Caterpillar Inc., Peoria, IL (US)

(72) Inventors: Mark Allen Garety, Metamora, IL (US); Matthew Elliott Giannis, Peoria, IL (US); Josh W. Dorothy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 673 days.

(21) Appl. No.: 17/553,241

(22) Filed: Dec. 16, 2021

(65) Prior Publication Data

US 2023/0198320 A1    Jun. 22, 2023

(51) Int. Cl.
*H02K 1/20* (2006.01)
*H02K 9/19* (2006.01)

(52) U.S. Cl.
CPC .............. *H02K 1/20* (2013.01); *H02K 9/19* (2013.01)

(58) Field of Classification Search
CPC .................................. H02K 9/19; H02K 1/20
See application file for complete search history.

(56) References Cited

U.S. PATENT DOCUMENTS

| | | | |
|---|---|---|---|
| 8,829,744 B2 | 9/2014 | Pal | |
| 10,158,263 B2 | 12/2018 | Dlala et al. | |
| 2011/0234029 A1* | 9/2011 | Pal | H02K 9/197 310/54 |
| 2012/0080964 A1 | 4/2012 | Bradfield | |
| 2012/0286596 A1* | 11/2012 | Creviston | H02K 5/203 310/59 |
| 2014/0265662 A1 | 9/2014 | Shoykhet | |
| 2016/0006302 A1* | 1/2016 | Gugel | H02K 3/24 310/54 |
| 2017/0271955 A1* | 9/2017 | Hanumalagutti | H02K 5/203 |
| 2022/0393526 A1* | 12/2022 | Jelinewski | H02K 9/193 |

FOREIGN PATENT DOCUMENTS

| | | | | |
|---|---|---|---|---|
| CN | 2907043 Y | 5/2007 | | |
| CN | 107276266 A | * 10/2017 | | H02K 1/20 |
| CN | 107276266 B | 4/2019 | | |
| CN | 109450128 B | 6/2020 | | |
| CN | 111969791 A | 11/2020 | | |
| DE | 102019216125 A1 | * 4/2021 | | H02K 1/20 |
| JP | 2006033916 A | * 2/2006 | | |

OTHER PUBLICATIONS

Fan (CN 107276266 A) English Translation (Year: 2017).*
Arai (JP 2006033916 A) English Translation (Year: 2006).*
Written Opinion and International Search Report for Int'l. Patent Appln. No. PCT/US2022/051134, mailed Apr. 14, 2023 (13 pgs).

* cited by examiner

*Primary Examiner* — Tulsidas C Patel
*Assistant Examiner* — Robert E Mates
(74) *Attorney, Agent, or Firm* — vonBreisen

(57) ABSTRACT

A stator is disclosed. The stator has a stator core that has stator poles protruding in a radial direction and a stator. The stator core has an axial groove formed on its outer surface along a longitudinal axis that is used to direct a cooling fluid from a first end of the stator core towards a second end of the stator core that is opposite the first end. Further, the stator core has an annulus groove formed on its outer surface, with the annulus groove in fluid communication with the axial groove. The annulus groove receives the cooling fluid from the axial groove, and is located between the first end and the second end of the stator core.

11 Claims, 6 Drawing Sheets

FLUID COOLED STATOR WITH GROOVES IN STATOR CORE

TECHNICAL FIELD

The present disclosure generally relates to an electric motor and, more particularly, to a fluid cooled stator of the electric motor.

BACKGROUND

In manufacturing, mining, construction, transportation, and other fields of endeavor, it is often necessary to convert stored energy into mechanical energy. Electric motors are increasingly preferred for the benefits they provide relative to their internal combustion (IC) counterparts, such as being quieter and emitting less pollution. Moreover, the conversion of stored electrical energy into mechanical energy may be reversed, and the same basic system used to convert excess mechanical energy into stored electrical energy. An electric motor typically includes a stator which is stationary, i.e., non-rotating, and a rotor, which rotates within the stator. However, substantial current densities and rapidly changing flux densities experienced by the stator can lead to excess heat generation in the stator. The excess heat can lead to inefficient operation, due, for example, to increased electrical impedance in the windings, as well as to damage to the windings or other components. Fluid cooling systems utilizing oil or water cooling jackets, sleeves, or housings with cooling features on the external surfaces of, or internally through, the housing are used to cool the stator.

Chinese Patent 109450128 discloses a motor stator and an oil-cooled motor. The motor stator has a stator core and a winding coil, with the stator core having a stator yoke part and a stator tooth part. An in-slot oil duct is arranged between every two adjacent stator teeth, and a groove is formed by combining the iron core laminations in the axial direction and the circumferential direction.

While effective, there remains a need for improved stators for electric motors used in high wear applications, such as in the transportation and construction industries.

SUMMARY

In accordance with the present disclosure, a stator for an electric motor is disclosed. The stator has a stator core that has stator poles protruding in a radial direction and a stator winding. The stator core has an axial groove formed on its outer surface along a longitudinal axis that is used to direct a cooling fluid from a first end of the stator core towards a second end of the stator core that is opposite the first end. Further, the stator core has an annulus groove formed on its outer surface, with the annulus groove in fluid communication with the axial groove. The annulus groove receives the cooling fluid from the axial groove, and is located between the first end and the second end of the stator core.

In accordance with another aspect of the present disclosure, a liquid cooled stator and rotor assembly is disclosed. The liquid cooled stator and rotor assembly has a stator, a rotor, and a stator housing. The stator has a stator core that has stator poles protruding in a radial direction and a stator winding. The stator core has an axial groove formed on its outer surface along a longitudinal axis that is used to direct a cooling fluid from a first end of the stator core towards a second end of the stator core that is opposite the first end. Further, the stator core has an annulus groove formed on its outer surface, with the annulus groove in fluid communication with the axial groove. The annulus groove receives the cooling fluid from the axial groove, and is located between the first end and the second end of the stator core.

In accordance with a further aspect of the present disclosure, a method of cooling a stator assembly is disclosed. The method includes providing a stator assembly that has a stator surrounded by a stator housing and has a rotor. The stator has a stator core that has stator poles protruding in a radial direction and a stator winding. The stator core has an axial groove formed on its outer surface along a longitudinal axis that is used to direct a cooling fluid from a first end of the stator core towards a second end of the stator core that is opposite the first end. Further, the stator core has an annulus groove formed on its outer surface, with the annulus groove in fluid communication with the axial groove. The annulus groove receives the cooling fluid from the axial groove, and is located between the first end and the second end of the stator core. The method further includes flowing the cooling fluid across an axial flow passage that is formed by the axial groove and the stator housing, and flowing the cooling fluid from the axial flow passage into an annulus flow groove that is formed by the annulus groove and the stator housing.

These and other aspects and features of the present disclosure will be more readily understood when read in conjunction with the accompanying drawings.

DETAILED DESCRIPTION

This disclosure relates to electric motors, generators, alternators, and other devices having a stator wherein cooling is needed, e.g., to provide damage control, improved efficiency, and so on. An electric motor is an electrical machine that converts electric electrical energy into mechanical energy.

Figure 1:
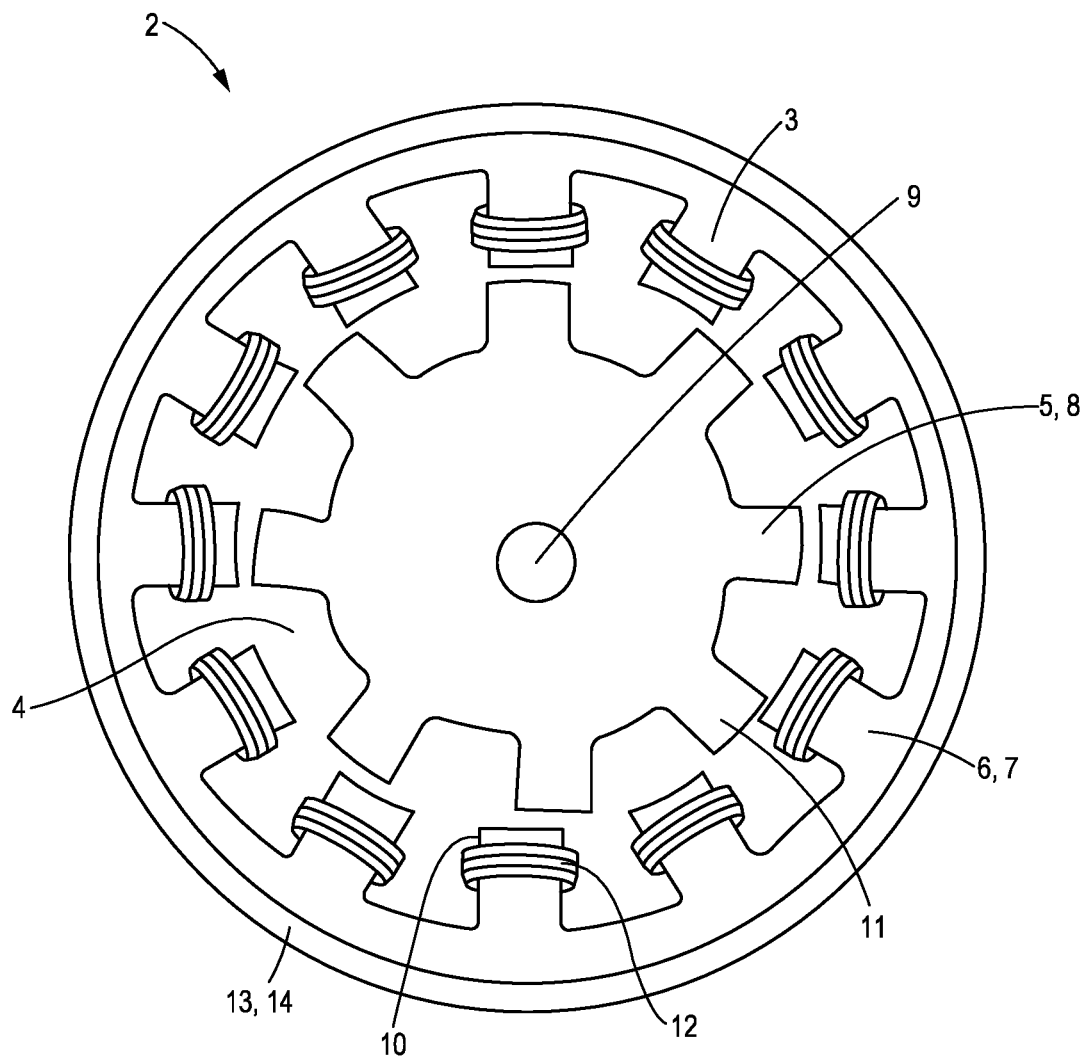
FIG. 1 is a diagrammatic cross-sectional end view of an exemplary stator and rotor assembly for use in an electric motor, in accordance with the present disclosure.

Turning now to a more detailed description of the principles set forth herein, FIG. 1 is a cross-sectional end view of a stator and rotor assembly 2, e.g., for use in an electric motor or generator. A stator 3 is a stationary component having a generally cylindrical interior cavity 4, in which a rotor 5 is positioned. The rotor 5 is the rotatable component and is supported by one or more end bearings (not shown) to be rotatably held within the cavity of the stator 3. In one exemplary embodiment, there may be two or more leads (not shown) to the stator 3. The leads serve to supply or collect power to the stator and rotor assembly 2. The electrical energy collected or applied may be of an AC format, or may be multiple phases.

The stator may include a stator core 6 formed by laminating a plurality of magnetically permeable laminations 7, made out of, for example, iron, cobalt, nickel, or any other permeable metal or alloy thereof. Similarly, the rotor 5 may include a rotor core 8 formed of magnetically permeable sheets. Further, the rotor 5 may be disposed in a substantially concentric relation to the stator core 7. The rotor 5 may include a bore 9 through which a shaft (not shown) may extend for connection to a load. The stator 3 may be configured to generate a magnetic flux proportional to a supplied electric current, which may cause rotation of the rotor 5, which in turn drives the shaft.

In one exemplary embodiment, the stator 3 may further include a plurality of stator poles 10 circumferentially disposed at predetermined intervals. In the illustrated embodiment, the stator poles 10 are protruding radially inwardly from the stator core 6. Similarly, rotor poles 11 are illustrated protruding radially outwardly from the rotor core 8. However, a person skilled in the art may understand that, the stator poles 10 or the rotor poles 11 may be differently configured. Further, the stator poles 10 and the rotor poles 11 may be in equal or different width from each other.

Further a plurality of stator windings 12 are disposed over the stator poles 10. In the illustrated embodiment, each of the stator poles 10 may include a stator winding 12. The stator winding 12 may be wound around each of the stator poles 10 protruding as a bundle. In one exemplary embodiment, the windings 12 are configured to be distributed over multiple stator poles 10, for example, in distributed or lap wound electric motors. In the stator and rotor assembly 2, each of the stator windings 12 may be identical or different in shape from each other. Each of the stator windings 12 may be disposed over the stator poles 10 with a space therebetween. In an electric machine having the present stator and rotor assembly 2, the stator winding 12 is energized to create a magnetic field which provides a torque to cause rotation of the rotor 5, which in turn may impart a rotary motion to the load. In an alternative embodiment, the rotor 5 may have windings disposed over the rotor poles 11.

Figure 6:
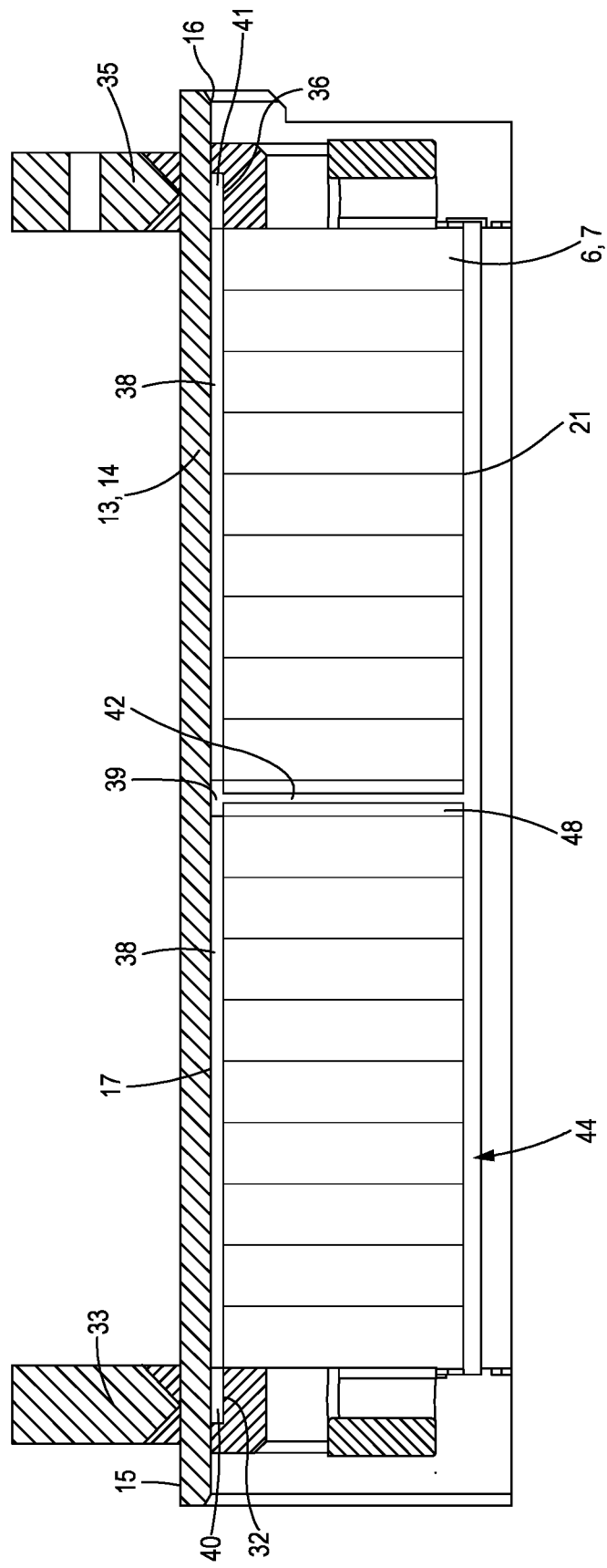
FIG. 6 is a partial cross-sectional side view of the stator of FIG. 4, in accordance with the present disclosure.

Additionally, a stator housing 13, or sleeve or jacket, may generally consist of a shell 14. As shown in FIG. 1, the shell 14 may be tubular having a first open end 15 (FIG. 6) and an opposing second open end 16 (FIG. 6). Shell 14 may substantially enclose, or surround, the stator core 6. The shell 14 further has an interior surface 17 (FIG. 6).

Figure 3:
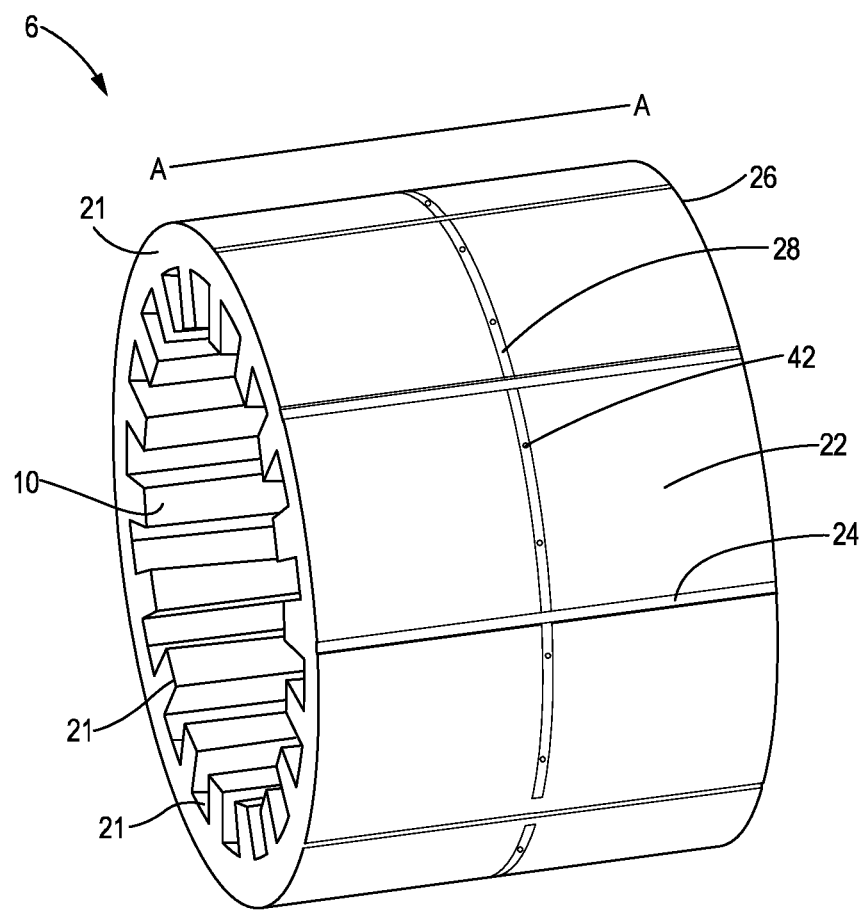
FIG. 3 is a perspective view of an exemplary stator core of the stator of FIG. 2, in accordance with the present disclosure.

Turning to FIG. 3, the stator core 6 of the stator 3 is shown in more detail. In addition to the stator poles 10 an interior surface of the stator core 21, an outer surface, or exterior surface, of the stator core 22 has one or more axial grooves 24 formed thereon. The axial grooves 24 move in an axial direction along a longitudinal axis A-A of the stator core 6 and are configured to direct a cooling fluid from a first end of the stator core 25 to a second end of the stator core 26, and are configured to direct a cooling fluid from the second end of the stator core 26 towards the first end of the stator core 25. The cooling fluid may be water, oil, synthetic oil, or any other fluid used to cool electrical components. As shown best in FIG. 4, in one exemplary embodiment, the stator core 6 may have a plurality of axial grooves 24, with each axial groove 24 aligning with, and oppositely positioned of, each of the stator poles 10 of the stator core 6. In another exemplary embodiment, the stator core 6 may have axial grooves 24 that are offset of the stator poles 10, and align, oppositely positioned of, each of a troughs 27 (FIG. 4) of the stator core. The troughs 27 being positioned between each of the stator poles 10.

Referring back to FIG. 2, and with reference to FIG. 3, the stator core 3 also may have a annulus groove 28. The annulus groove 28 is a groove that travels in a circumferential direction along the outside surface of the stator core 22. The circumferential direction, in one exemplary embodiment, may be perpendicular to the longitudinal axis A-A of the stator core 6. Further, the annulus groove 28 is in fluid communication with each of the axial grooves 24, and is configured to receive the cooling fluid from the axial groove 24 as the cooling fluid flows from the first end of the stator core 25 towards the second end of the stator core 26, and as the cooling fluid flows from the second end of the stator core 26 towards the first end of the stator core 25. Thus, the cooling fluid flowing in the axial grooves from the first and second ends of the stator core 25, 26, is collected in the annulus groove 28 and flows around the circumference of the stator core 6 in the annulus groove 28. The annulus groove 28 may extend around the entire circumference of the stator core 6, or may extend less than the entire circumference of the stator core 6.

Figure 4:
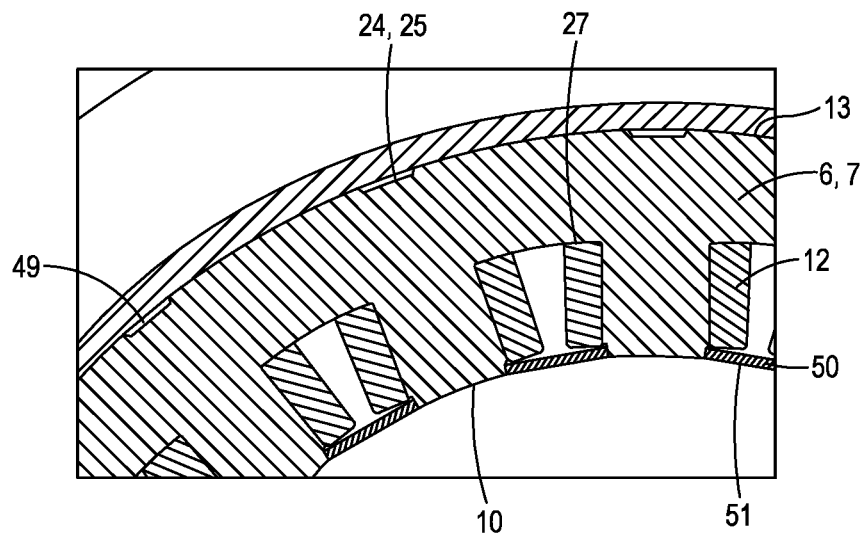
FIG. 4 is a partial cross-sectional end view of the stator and rotor assembly, in accordance with the present disclosure.

Referring back to FIG. 2, on the stator 3 a first annulus end ring 30 may be attached to the first end of the stator core 25, and a second annulus end ring 31 is attached to the second end of the stator core 26. The first and second annulus end rings 30, 31 may be attached to the stator core 6 by welding, or any other attachment means known in the art. The first and second annulus end rings 30, 31, are circular hollow disk shaped rings that are configured to supply the cooling fluid to the axial grooves 24. Specifically, in one exemplary embodiment, as shown in FIGS. 4 and 6, a first inlet port 33 supplies the cooling fluid, under pressure, to a first annulus ring circumferential groove 32. The cooling fluid is configured to be supplied under pressure, such as, pumped from an oil reservoir (not shown) and flow around the first annulus ring circumferential groove 31 and into the fluidly communicable axial grooves 24 from the first end of the stator core 25. Similarly, a second inlet port 35 supplies the cooling fluid, under pressure, to a second annulus ring circumferential groove 36. The cooling fluid is configured to be supplied under pressure, such as, pumped from the oil reservoir and flow around the second annulus ring circumferential groove 36 and into the fluidly communicable axial grooves 24 from the second end of the stator core 26.

As previously discussed, the stator 3 may have a stator housing 13. When the stator core 6 is surrounded by, or attached to, the shell 14 of the stator housing 13, as best shown in FIG. 6, the interior surface of the shell 17 of the stator housing 13 and the axial groove 24 form a axial flow passage 38. Similarly, when the stator core 6 is surrounded by, or attached to, the shell 14 of the stator housing 13, the interior surface of the shell 17 of the stator housing 13 and the annulus groove 28 form an annulus flow passage 39. The axial flow passage 38 and the annulus flow passage 39, being covered by the interior surface of the shell 17 and the axial groove 24 and annulus groove 28, respectfully, allow for the cooling fluid to flow from the first end of the stator core 25, and the second end of the stator core 26, towards, and around, the annulus groove 28 despite the orientation of the stator 3 due to the cooling fluid being supplied under pressure.

Further, the interior surface of the shell 17 of the stator housing 13 and the first annulus ring circumferential groove 32 form a first annulus ring circumferential passage 40, creating a closed passage to allow the cooling fluid to flow around the first annulus end ring 30. The interior surface of the shell 17 of the stator housing 13 and the second annulus ring circumferential groove 36 form a second annulus ring circumferential passage 41, creating a closed passage to allow the cooling fluid to flow around the second annulus end ring 31. Thus, in this embodiment, the cooling fluid is configured to flow through the first inlet port 33, around the first annulus ring circumferential passage 40, across the axial flow passage 38, and into and around the annulus flow passage 39. Additionally, in this embodiment, the cooling fluid is configured flow through the second inlet port 34, around the second annulus ring circumferential passage 41, across the axial flow passage 38, and into and around the annulus flow passage 39. In another exemplary embodiment, the first and second annulus rings 30, 31 contain the first and second annulus ring circumferential passages 40, 41, and the stator housing 13 is not required to form these passages.

Figure 2:
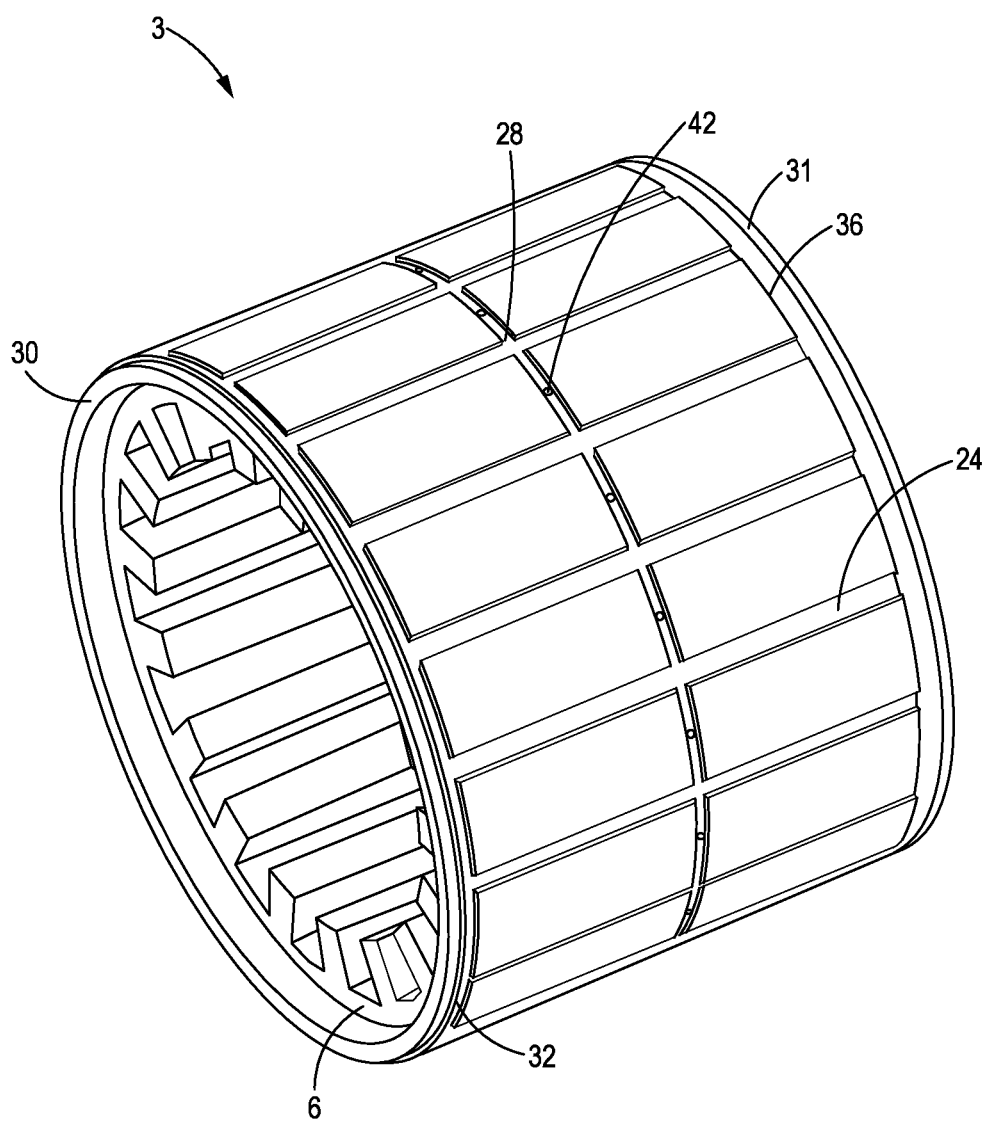
FIG. 2 is a perspective view of the stator of the stator and rotor assembly FIG. 1, in accordance with the present disclosure.

As shown in FIGS. 2 and 3, the annulus groove 28 of the stator core 6 has one or more fluid apertures 42. The cooling fluid apertures 42 pass through the stator core 6, as shown in FIG. 6, from the annulus groove 28, or annulus flow passage 39, through the interior surface of the stator core 21, thus allowing the cooling fluid to flow from the annulus flow passage 39 to the stator windings 12, and/or the rotor 5 or the stator poles 10 and flow through the stator 3 to be collected in an oil reservoir (not shown).

Figure 5:
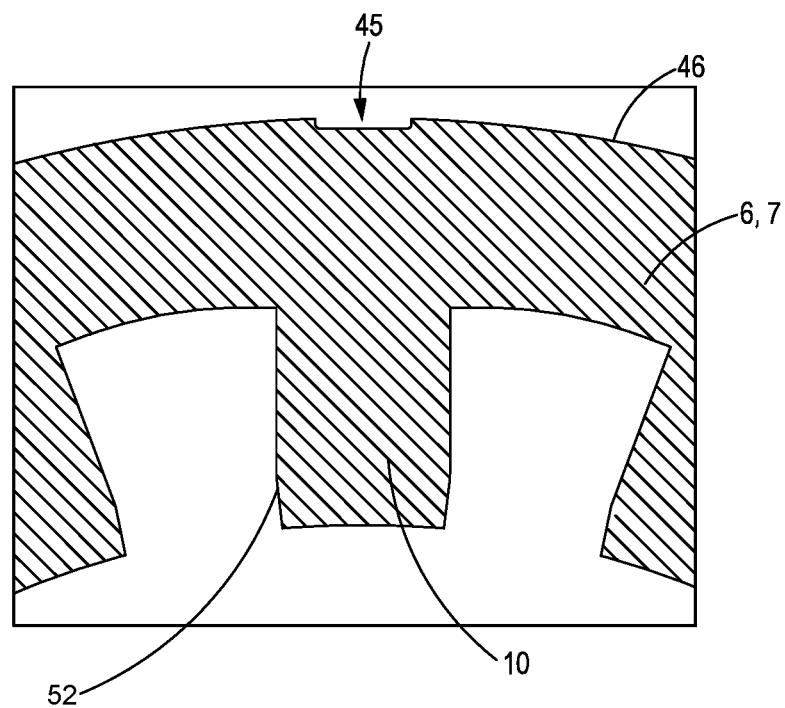
FIG. 5 is a partial cross-sectional end view of the stator core of FIG. 4, in accordance with the present disclosure.

In one exemplary embodiment, the stator core 6 may be a stack 44 of one or more laminations 7. As shown in FIG. 4, the lamination 7 may be a singular ring piece or may be comprised of multiple pieces attached together to form the ring shaped lamination 7. As shown in FIG. 5, the lamination has a stator pole 10 and a notch 45 on an outer surface of the lamination 46. When configured in the stack 44 forming the stator core 6, the notches 45 on each of the laminations 7 align to form the axial groove 24. In one exemplary embodiment, each lamination 7 of the stack 44 is less than 10 millimeters thick. In another exemplary embodiment, the stack 45 further has a annulus lamination forming the annulus groove, the annulus lamination 48 having a smaller diameter than the diameter of the other laminations 7 in the stack 44 to form the annulus groove 28. In a further embodiment, the annulus groove 28 is formed by machining in one of the laminations 7 in the stack 45.

Figure 7:
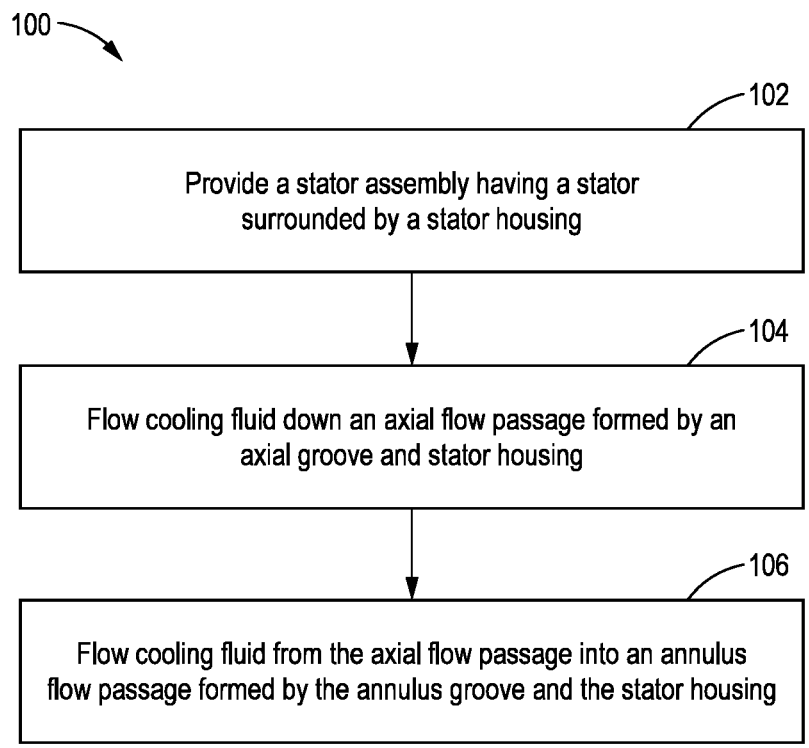
FIG. 7 is a flow chart illustrating a method of cooling a stator and rotor assembly, in accordance with the present disclosure.

In order to seal the stator windings 12 from the cylindrical interior cavity 4 of the stator core 6, a series of spacers 50, sometimes referred to as "sticks," are inserted into receiving grooves 52 (FIG. 5) in the stator core 6 at the ends of the stator poles 10, such that the inner-facing surface of the stator cylindrical interior cavity 4 is composed of interior surfaces of the stator core 21 as well as the inward facing spacer surfaces 51 of the spacers 50 (FIG. 7).

INDUSTRIAL APPLICABILITY

In general, the teachings of the present disclosure may find applicability in many industries including, but not limited to, electric machines having a stator. More specifically, the teachings of the present disclosure may find applicability in any industry using stators in electric machine that require cooling of a stator to meet performance requirements.

In accordance with the scope of the present disclosure, in one such operation it is desirable to cool a stator using a cooling fluid with the design of a lamination cooling channel between the lamination and the stator housing. Axial channels create an enclosed passage between the laminations and the outer stator housing. Cooling fluid is supplied to annulus end rings attached to the stator core, and the cooling fluid flows from the annulus end rings axially through axial flow passages, which are formed by notches in the laminations, to supply the cooling fluid to the annulus flow passage.

Turning now to FIG. 8, with continued reference to FIGS. 1-6, a flowchart illustrating an exemplary method 100 for cooling a stator assembly. At block 102, a stator assembly 2 having a stator 3 surrounded by a stator housing 13 is provided. The stator 3 has a stator core 6 that has a plurality of stator poles 10 protruding in a radial direction, and a stator winding 12 wound around each of the stator poles 10. An axial groove 24 is formed on an outer surface of the stator core 22 along a longitudinal axis A-A of the stator core 6 and is configured to direct a cooling fluid from a first of the stator core 25 towards a second end of the stator core 26. A annulus groove 28 is formed on the outer surface of the stator core 22 and is configured to receive the cooling fluid from the axial groove 24. At block 104, the cooling fluid flows through an axial flow passage 38 formed by the axial groove 28 and the stator housing 13. At block 106, the cooling fluid flows from the axial flow passage 38 into an annulus flow passage 39 formed by the annulus groove 28 and the stator housing 13.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A stator, comprising:
    a stator core having a plurality of stator poles protruding radially inward from an interior surface of the stator core;
    a stator winding disposed over each of the stator poles;
    a series of spacers insterted into receiving grooves at radial inward ends of adjacent stator poles and preventing the stator windings from entering a cylindrical interior cavity of the stator core;
    an axial groove formed on the outer surface of the stator core along a longitudinal axis of the stator core and configured to direct a cooling fluid from a first end of the stator core towards a second end of the stator core opposite the first end;
    an annulus groove formed on the outer surface of the stator core, the annulus groove being in fluid communication with the axial groove, is configured to receive the cooling fluid from the axial groove, and is located between the first end and the second end of the stator core, wherein the annulus groove has one or more cooling fluid apertures, the cooling fluid apertures passing through the stator core from the annulus groove to an interior surface of the stator core;
    a stator housing surrounding the stator core, wherein the axial groove and the stator housing form an axial flow passage, and the annulus groove and the stator housing form an annulus flow passage;
    a first annulus ring circumferential groove formed on the outer surface of the stator core at the first end of the stator core;

a first annulus end ring attached to the first end of the stator core and having a first inlet port, wherein the cooling fluid flows into the first annulus ring circumferential groove from the first inlet port, flows from the first annulus ring circumferential groove to the axial groove towards the second end of the stator core, and flows from the axial groove into the annulus groove, wherein the first annulus end ring, the stator housing and the first annulus ring circumferential groove define a first annulus ring circumferential passage, wherein the cooling fluid flows through the first inlet port, around the first annulus ring circumferential passage, across the axial flow passage, and into and around the annulus flow passage, wherein the cooling fluid passes from the annulus flow passage through the cooling fluid apertures to the interior surface of the stator core to cool the stator winding;

a second annulus ring circumferential groove formed on the outer surface of the stator core at the second end of the stator core; and a second annulus end ring attached to the second end of the stator core and having a second inlet port, wherein the axial groove directs the cooling fluid from the second inlet port towards the first end of the stator core and the annulus groove.

2. The stator of claim 1, in which the stator core is formed of a stack of one or more laminations, each of the one or more laminations having a notch on a lamination outer surface and the notch of each of the one or more laminations aligning to form the axial groove.

3. The stator of claim 2, in which the stack further has an annulus lamination forming the annulus groove, the annulus lamination having a smaller diameter than the one or more laminations.

4. The stator of claim 1, in which there are a plurality of axial grooves, each axial groove of the plurality of axial grooves are formed opposite each stator pole of the plurality of stator poles on the stator core.

5. The stator of claim 1, wherein the second annulus end ring, the stator housing and the second annulus ring circumferential groove forming a second annulus ring circumferential passage, and the cooling fluid flows through the second inlet port, around the second annulus ring circumferential passage, across the axial flow passage, and into the annulus flow passage.

6. A liquid cooled stator and rotor assembly, the assembly comprising:
a stator, the stator comprising:
a stator core having a plurality of stator poles protruding radially inward from an interior surface of the stator core,
a stator winding disposed over each of the stator poles,
a series of spacers insterted into receiving grooves at radial inward ends of adjacent stator poles and preventing the stator windings from entering a cylindrical interior cavity of the stator core,
an axial groove formed on the outer surface of the stator core along a longitudinal axis of the stator core and configured to direct a cooling fluid from a first end of the stator core towards a second end of the stator core opposite the first end,
an annulus groove formed on the outer surface of the stator core, the annulus groove being in fluid communication with the axial groove, is configured to receive the cooling fluid from the axial groove, and is located between the first end and the second end of the stator core, wherein the annulus groove has one or more cooling fluid apertures, the cooling fluid apertures passing through the stator core from the annulus groove to an interior surface of the stator core,
a first annulus ring circumferential groove formed on the outer surface of the stator core at the first end of the stator core, and
a first annulus end ring attached to the first end of the stator core and having a first inlet port, wherein the cooling fluid flows into the first annulus ring circumferential groove from the first inlet port, flows from the first annulus ring circumferential groove to the axial groove towards the second end of the stator core, and flows from the axial groove into the annulus groove;
a rotor; and
a stator housing surrounding the stator core, wherein the axial groove and the stator housing form an axial flow passage, and the annulus groove and the stator housing form an annulus flow passage, wherein the first annulus end ring, the stator housing and the first annulus ring circumferential groove define a first annulus ring circumferential passage, wherein the cooling fluid flows through the first inlet port, around the first annulus ring circumferential passage, across the axial flow passage, and into and around the annulus flow passage, wherein the cooling fluid passes from the annulus flow passage through the cooling fluid apertures to the interior surface of the stator core to cool the stator winding.

7. The assembly of claim 6, the stator comprising:
a second annulus ring circumferential groove formed on the outer surface of the stator core at the second end of the stator core; and
a second annulus end ring attached to the second end of the stator core and having a second inlet port, wherein the axial groove directs the cooling fluid from the second inlet port towards the first end of the stator core and the annulus groove.

8. A method of cooling a stator and rotor assembly, the method comprising:
providing a stator assembly having a stator surrounded by a stator housing and having a rotor, the stator comprising:
a stator core having a plurality of stator poles protruding radially inward from an interior surface of the stator core,
a stator winding disposed over each of the stator poles,
a series of spacers insterted into receiving grooves at radial inward ends of adjacent stator poles and preventing the stator windings from entering a cylindrical interior cavity of the stator core,
an axial groove formed on the outer surface of the stator core along a longitudinal axis of the stator core and configured to direct a cooling fluid from a first end of the stator core towards a second end of the stator core opposite the first end,
an annulus groove formed on the outer surface of the stator core, the annulus groove being in fluid communication with the axial groove, is configured to receive the cooling fluid from the axial groove, and is located between the first end and the second end of the stator core, wherein the annulus groove has one or more cooling fluid apertures, the cooling fluid apertures passing through the stator core from the annulus groove to an interior surface of the stator core, a stator housing surrounding the stator core, wherein the axial groove and the stator housing form an axial flow passage, and the annulus groove and the stator housing form an annulus flow passage, a first annulus ring circumferential groove formed on the outer surface of the stator core at the first end of the stator core, and a first annulus end ring attached to the first end of the stator core and having a first inlet port, wherein the cooling fluid flows into the first annulus ring circumferential groove from the first inlet port, flows from the first annulus ring circumferential groove to the axial groove towards the second end of the stator core, and flows from the axial groove into the annulus groove, wherein the cooling fluid passes from the annulus flow passage through the cooling fluid apertures to the interior surface of the stator core to cool the stator winding;

flowing the cooling fluid through the first inlet port, around a first annulus ring circumferential flow passage formed by the first annulus end ring, the stator housing and the first annulus ring circumferential groove, across the axial flow passage;

flowing the cooling fluid from the axial flow passage into the annulus flow passage; and flowing the cooling fluid from the annulus flow passage through the cooling fluid apertures to the interior surface of the stator core to cool the stator winding.

9. The method of claim 8, further comprising flowing the cooling fluid from the annulus flow passage through a cooling fluid aperture to the interior surface of the stator core to cool the stator winding wound around each of the stator poles.

10. The method of claim 8, in which the stator core is formed of a stack of one or more laminations, each of the one or more laminations having a notch on a lamination outer surface and the notch of each of the one or more laminations aligning to form the axial groove.

11. The method of claim 8, in which the stator comprises:

a second annulus ring circumferential groove formed on the outer surface of the stator core at the second end of the stator core; and a second annulus end ring attached to the second end of the stator core and having a second inlet port, wherein the axial flow passage directs the cooling fluid from the second inlet port towards the first end of the stator core and the annulus groove.

* * * * *